United States Patent
Kwon

(10) Patent No.: US 9,958,639 B2
(45) Date of Patent: May 1, 2018

(54) IMAGING LENS

(71) Applicant: LG INNOTEK CO., LTD., Seoul (KR)

(72) Inventor: Duk Keun Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 64 days.

(21) Appl. No.: 14/348,715

(22) PCT Filed: Sep. 25, 2012

(86) PCT No.: PCT/KR2012/007714
§ 371 (c)(1),
(2) Date: Mar. 31, 2014

(87) PCT Pub. No.: WO2013/048089
PCT Pub. Date: Apr. 4, 2013

(65) Prior Publication Data
US 2014/0247510 A1    Sep. 4, 2014

(30) Foreign Application Priority Data
Sep. 30, 2011   (KR) .................. 10-2011-0099868

(51) Int. Cl.
*G02B 9/12*  (2006.01)
*G02B 13/00* (2006.01)
*G02B 13/18* (2006.01)

(52) U.S. Cl.
CPC ......... *G02B 13/0035* (2013.01); *G02B 13/18* (2013.01)

(58) Field of Classification Search
CPC ........................... G02B 13/0035; G02B 13/18
(Continued)

(56) References Cited

U.S. PATENT DOCUMENTS 3,066,575 A  * 12/1962  Mukai .................... G02B 13/02
                                              359/768
2005/0007481 A1 *  1/2005  Yamaguchi ............. G02B 9/12
                                              348/335
(Continued)

FOREIGN PATENT DOCUMENTS

CN          1576939 A      2/2005
CN          1677154 A     10/2005
(Continued)

OTHER PUBLICATIONS

International Search Report in International Application No. PCT/KR2012/007714, filed Sep. 25, 2012.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

The present invention relates to an imaging lens, the imaging lens including, in an ordered way from an object side, a first lens having positive (+) refractive power and convexly formed at an object side surface; a second lens having positive (+) refractive power and concavely formed at an object side surface; and a third lens having negative (−) refractive power, wherein the imaging lens meets a conditional expression of 1.6<ND3<1.7, where ND3 is a refractive index of the third lens.

12 Claims, 3 Drawing Sheets

(58) Field of Classification Search
 USPC ............... 359/689, 645, 650–651, 661, 764,
 359/767–769, 772, 779, 791
 See application file for complete search history.

(56) References Cited

U.S. PATENT DOCUMENTS

2005/0231823 A1\* 10/2005 Sato .............................. 359/692
2010/0328518 A1\* 12/2010 Iba et al. ....................... 348/340
2011/0096221 A1\* 4/2011 Tsai ................... G02B 13/0035
 348/340

FOREIGN PATENT DOCUMENTS

| CN | 101946200 A | 1/2011 |
| JP | 2004-226487 A | 8/2004 |
| JP | 2005-242286 A | 9/2005 |
| JP | 2005-284002 A | 10/2005 |
| JP | 2006-047944 A | 2/2006 |
| JP | 2007-127960 A | 5/2007 |
| JP | 2008-216807 A | 9/2008 |
| JP | 2008-276200 A | 11/2008 |
| JP | 2010-060833 A | 3/2010 |
| JP | 2010-256608 A | 11/2010 |
| TW | I258596 B | 7/2006 |
| TW | I327233 B | 7/2010 |
| TW | 2011-15180 A | 5/2011 |

OTHER PUBLICATIONS

Office Action dated Jan. 28, 2013 in Korean Application No. 10-2011-0099868.
Office Action dated Jan. 28, 2013 in Japanese Patent publication No. 2015101000643480.
Office Action dated Aug. 3, 2016 in Taiwanese Application No. 10520962490.

\* cited by examiner

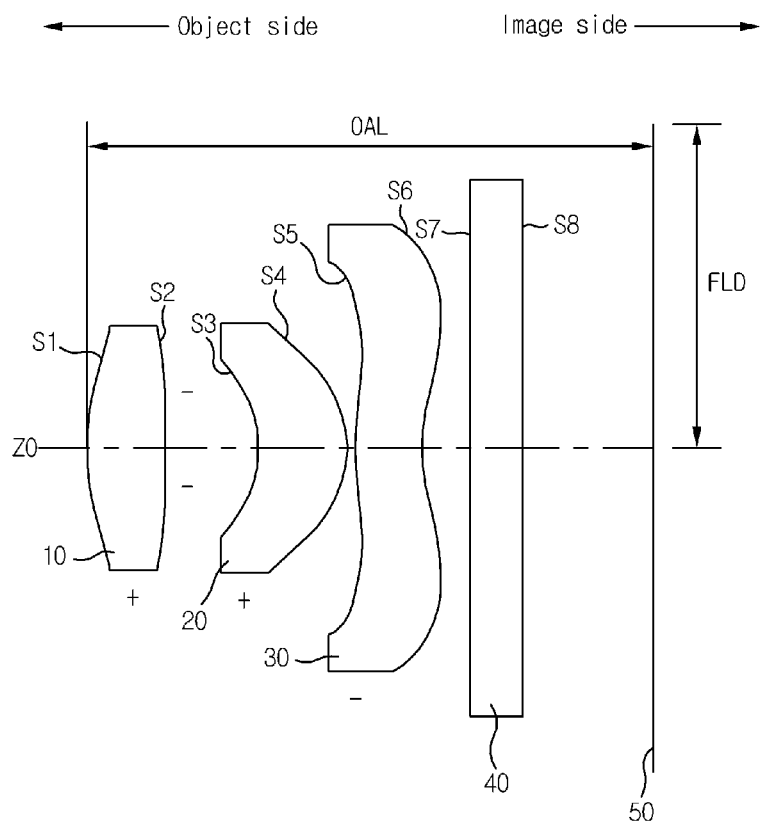

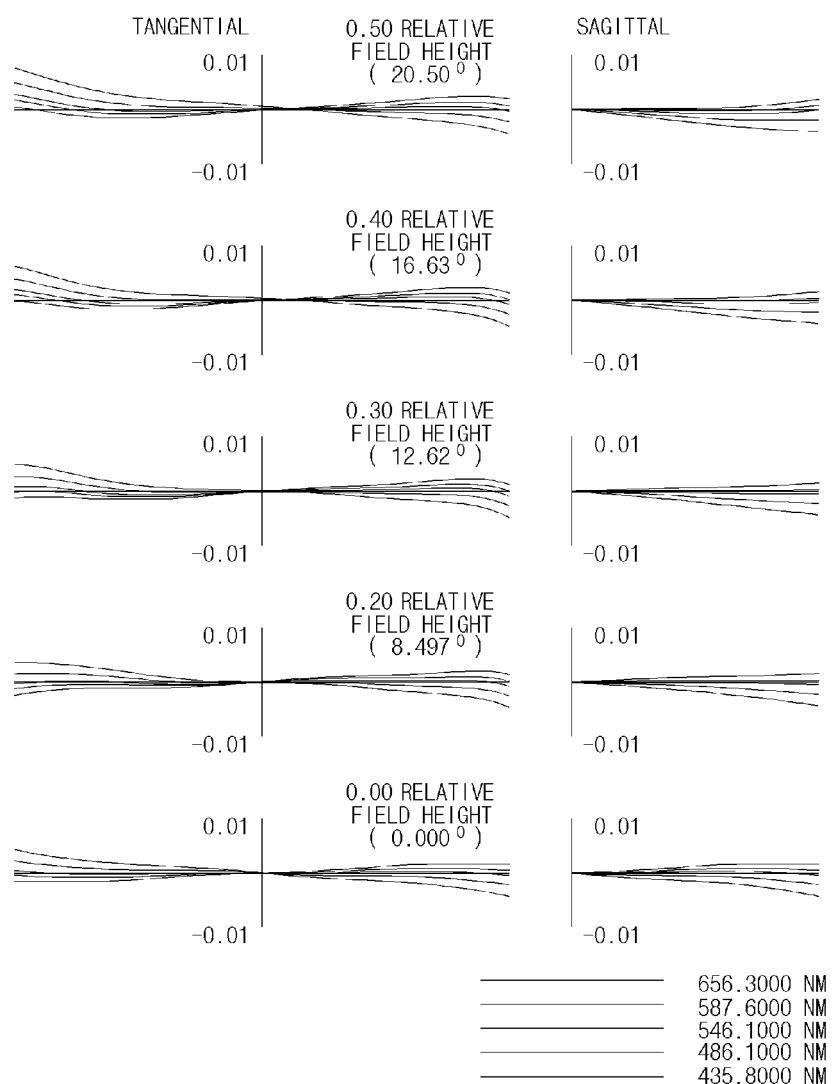

[Fig. 2b]
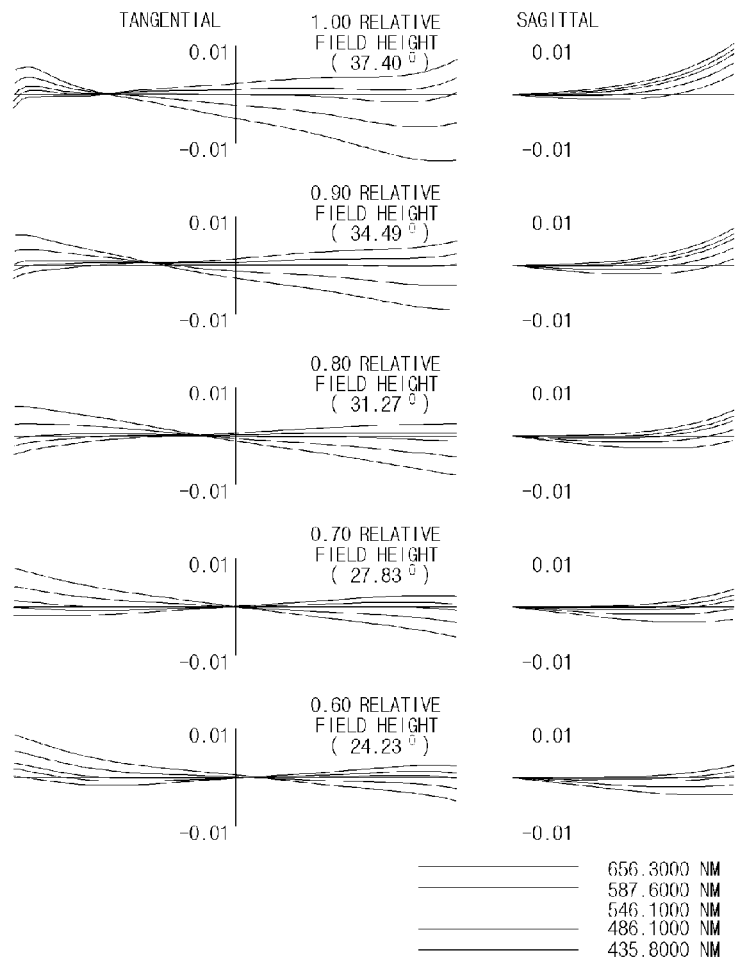
[Fig. 3]
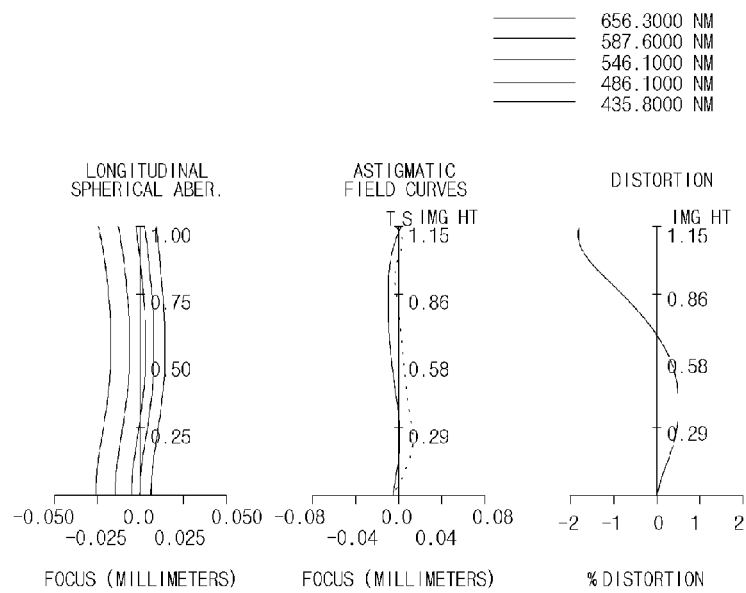

IMAGING LENS

CROSS-REFERENCE TO RELATED APPLICATIONS

This application is the U.S. national stage application of International Patent Application No. PCT/KR2012/007714, filed Sep. 25, 2012, which claims priority to Korean Application No. 10-2011-0099868, filed Sep. 30, 2011, the disclosures of each of which are incorporated herein by reference in their entirety.

TECHNICAL FIELD

The teachings in accordance with exemplary embodiments of this invention relate generally to an imaging lens.

BACKGROUND ART

Regarding an image pick-up system, there have been recent researches into mobile terminal used camera modules, DSCs (Digital Still Camera), camcorders, PC cameras (imaging lens attached personal computers), etc. The most important component to obtain an image for such an image pick-up system-related camera module is an imaging lens that produces images.

DISCLOSURE OF INVENTION

Technical Problem

Accordingly, embodiments of the present invention may relate to an imaging lens that substantially obviates one or more of the above disadvantages/problems due to limitations and disadvantages of related art, and it is an object of the present invention to provide an imaging lens configured to realize a compact imaging lens configured with a high resolution and a wide angle.

Technical problems to be solved by the present invention are not restricted to the above-mentioned, and any other technical problems not mentioned so far will be clearly appreciated from the following description by skilled in the art.

Solution to Problem

In one general aspect of the present invention, there is provided an imaging lens, the imaging lens comprising, in an ordered way from an object side: a first lens having positive (+) refractive power and convexly formed at an object side surface; a second lens having positive (+) refractive power and concavely formed at an object side surface; and a third lens having negative (−) refractive power, wherein the imaging lens meets a conditional expression of $1.6=ND3<1.7$, where ND3 is a refractive index of the third lens.

Preferably, but not necessarily, the first lens takes a convex form at both sides.

Preferably, but not necessarily, the third lens takes a meniscus form convexly formed at an object side surface.

Preferably, but not necessarily, power of the second lens is greater than that of the first and third lenses.

Preferably, but not necessarily, the imaging lens meets a conditional expression of $0.8<f1/f<1.5$, where f is an entire focus distance (focal length) of the imaging lens, and f1 is a focus distance of the first lens.

Preferably, but not necessarily, the imaging lens meets a conditional expression of $0.8<f2/f<1.5$, where f is an entire focus distance (focal length) of the imaging lens, and f2 is a focus distance of the first lens.

Preferably, but not necessarily, the imaging lens meets a conditional expression of $f2/f1<1.0$, where f1 is a focus distance (focal length) of the first lens, and f2 is a focus distance of the second lens.

Preferably, but not necessarily, the imaging lens meets a conditional expression of $0.7<\tan \Theta<0.85$, where half field angle of maximum image height is $\Theta$.

Preferably, but not necessarily, the imaging lens meets a conditional expression of $0.8<OAL/((FLD)\times 2)<1.2$, where OAL is a total length of an imaging system, and FLD is a maximum image height of the imaging system.

Preferably, but not necessarily, the imaging lens meets a conditional expression of $1.5<ND<1.6$, where ND is a refractive index of the first and second lenses.

Preferably, but not necessarily, the imaging lens meets a conditional expression of $50<vd<60$, where vd is an Abbe's number of the first and second lenses.

Preferably, but not necessarily, the imaging lens meets a conditional expression of $20<Vd3<30$, where Vd3 is an Abbe's number of the third lens.

Preferably, but not necessarily, an aperture (diaphragm) is positioned between the first and second lenses.

Preferably, but not necessarily, the third lens is made of plastic material.

Preferably, but not necessarily, at least one surface of the first, second and third lenses is aspheric.

In another general aspect of the present invention, there is provided an imaging lens, the imaging lens comprising, in an ordered way from an object side: a first lens having positive (+) refractive power and convexly formed at an object side surface; a second lens having positive (+) refractive power and concavely formed at an object side surface; and a third lens having negative (−) refractive power, wherein the imaging lens meets a conditional expression of $0.7<\tan \Theta<0.85$, where half field angle of maximum image height is $\Theta$.

Preferably, but not necessarily, the first lens takes a convex form at both sides.

Preferably, but not necessarily, the imaging lens meets a conditional expression of $1.6=ND3<1.7$, where ND3 is a refractive index of the third lens.

In still another general aspect of the present invention, there is provided an imaging lens, the imaging lens comprising, in an ordered way from an object side: a first lens having positive (+) refractive power and convexly formed at an object side surface; a second lens having positive (+) refractive power and concavely formed at an object side surface; and a third lens having negative (−) refractive power, wherein the imaging lens meets a conditional expression of $0.8<OAL/((FLD)\times 2)<1.2$, where OAL is a total length of an imaging system, and FLD is a maximum image height of the imaging system.

Preferably, but not necessarily, the imaging lens meets a conditional expression of $1.6=ND3<1.7$, where ND3 is a refractive index of the third lens.

Advantageous Effects of Invention

The imaging lens according to the present invention has advantageous effects in that a first lens is made to take a convex form at both sides, and a third lens is made of plastic material with a high refractive index, enabling to realize a wide-angled, compact and high resolution imaging lens having a new power structure.

BRIEF DESCRIPTION OF DRAWINGS

FIG. 1 is a constructional view illustrating a camera module lens according to the present invention.

FIGS. 2a and 2b are graphs measuring coma aberration according to an exemplary embodiment of the present invention.

FIG. 3 is a graph illustrating an aberration according to an exemplary embodiment of the present invention.

BEST MODE FOR CARRYING OUT THE INVENTION

Hereinafter, exemplary embodiments of the present invention will be described in detail with reference to the accompanying drawings.

In describing the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, the imaging lens according to exemplary embodiments of the present invention will be described in detail with reference to the accompanying drawings.

FIG. 1 is a constructional view illustrating an imaging lens according to an exemplary embodiment of the present invention.

The imaging lens formed with a plurality of lenses is arranged about an optical axis (ZO), where thickness, size, and shape of each lens are rather overdrawn in FIG. 1 for description, and a spherical shape or an aspheric shape has been only presented as one exemplary embodiment, but obviously not limited to this shape.

Referring to FIG. 1, a camera lens module according to the present invention includes, in an ordered way from an object side, a first lens (10), a second lens (20), a third lens (30), a filter (40) and a photo-detector (light receiving element, 50).

Light corresponding to image information of a subject is incident on the photo-detector (50) by passing the first lens (10), the second lens (20), the third lens (30) and the filter (40).

Advantageously, the first lens (10) is made to take a convex form at both sides, and the third lens is made of plastic material with a high refractive index of 1.6 or more, enabling to realize a wide-angled, compact and high resolution imaging lens having a new power structure.

Hereinafter, in the description of the construction of each lens, "object side surface" means the surface of a lens facing an object side with respect to an optical axis, "image side surface" means the surface of the lens facing an imaging surface with respect to the optical axis, and image side surface means the surface of the lens a capturing surface with respect to an optical axis.

In the specification, "imaging" basically may refer to the process in which an imaging lens receives light from a subject in the field and outputs an image (image signal and image data) indicating the same. However, if the imaging lens is repeatedly generating the image indicating the subject in the field at a predetermined cycle, "imaging" may mean the process of storing a specific image out of the images generated by the imaging lens in a storage unit. In other words, from a certain standpoint, "imaging" may mean a process in which the imaging lens acquires an image indicating the content of the subject in the field and having the same in a state subjectable to the measurement process at a certain intended timing.

The first lens (10) has positive (+) refractive power, and is convexly formed at an object side surface (S1). Furthermore, the first lens (10) may be convexly formed at an object side surface (S1) only, or may take a convex form at both sides, where the object side surface (S1) and image side surface (S2) are convexly formed.

The second lens (20) has positive (+) refractive power, and is concavely formed at an object side surface (S3). Furthermore, a separate aperture may be interposed between the first and second lenses (10, 20). In addition, the third lens (30) has negative (−) refractive power, and takes a meniscus form convexly formed at an object side surface (S5). Furthermore, the power of second lens (20) is greater than that of the first and third lenses (10, 30). Still furthermore, at least one surface of the first, second and third lenses (10, 20, 30) is aspheric.

For information, 'S2' of FIG. 1 is an image side surface of the first lens (10), 'S4' is an image side surface of the second lens (20), 'S6' is an image side surface of the third lens (30), and 'S7' and 'S8' are respectively object side surface and image side surface of the filter (40).

The filter (40) may be any one optical filter selected from an infrared filter and a cover glass. The filter (40), if applied with the infrared filter, prevents radiant heat emitted from external light from being transferred to the photo-detector (70). Furthermore, the infrared filter transmits visible light and reflects and outputs infrared rays to the outside.

The photo-detector (70) is an image sensor, for example, CCD (Charge Coupled Device) or CMOS (Complementary Metal Oxide Semiconductor), etc.

Because the later-described conditional expressions and exemplary embodiments are preferred embodiments enhancing an effect of interaction, it would be obvious to those skilled in the art that the present invention is not necessarily comprised of the following conditions. For example, only by satisfying some conditions of later-described conditional expressions, the lens construction (framework) of the present invention may have an enhanced effect of interaction.

[Conditional expression 1] 0.8<f1/f<1.5
[Conditional expression 2] 0.8<f2/f<1.5
[Conditional expression 3] f2/f1<1.0
[Conditional expression 4] 0.7<tan Θ 0.85
[Conditional expression 5] 0.8<OAL/((FLD)×2)<1.2
[Conditional expression 6] 1.5<ND<1.6
[Conditional expression 7] 1.6=ND3<1.7
[Conditional expression 8] 50<vd<60
[Conditional expression 9] 20<Vd3<30 where, f: an entire focus distance (focal length) of the imaging lens
  f1: a focus distance of the first lens
  f2: a focus distance of the second lens
  Θ: half field angle of maximum image height
  OAL: a total length of an imaging system (a distance from object side surface of the first lens to an image-forming surface)
  FLD: a maximum image height of the imaging system.
  ND: a refractive index of the first and second lenses.
  ND3: a refractive index of the third lens
  Vd: an Abbe's number of the first and second lenses
  Vd3: an Abbe's number of the third lens.

Conditional expressions 1 and 3 specify refractive powers of the first and second lens (10, 30). The first, second and third lenses (10, 20, 30) have refractive powers each having an appropriate compensation of spherical aberration and appropriate chromatic aberration according to the conditional expressions 1, 2 and 3.

Conditional expressions 6 and 7 specify refractive indexes of the first and third lenses (10, 30), conditional expressions 8 and 9 specify Abbe's numbers of first and third lenses (10, 30). The specification of Abbe's number of each lens is a condition for better compensation of chromatic aberration.

Hereinafter, the action and effect of the present invention will be described with reference to a specific exemplary embodiment. Aspheric mentioned in a later-exemplary embodiment is obtained from a known Equation 1, and 'E and its succeeding number' used in Conic constant k and aspheric coefficient A, B, C, D, E, F indicates 10's power. For example, E+01 denotes 10.sup.1, and E-02 denotes 10.sup.-2.

MathFigure $$z = \frac{cY^2}{1 + \sqrt{1 - (1+K)c^2 Y^2}} + AY^4 + BY^4 + CY^4 + DY^{4+}EY^{4+}FY^{4+}$$ [Math. 1]

where, z: distance from the lens's top-point to an optical axis direction,
c: basic curvature of a lens, Y: distance towards a direction perpendicular to an optical axis, K: conic constant, and A, B, C, D, E, F: aspheric coefficients

EXEMPLARY EMBODIMENTS

The following Table 1 shows an exemplary embodiment matching the aforementioned conditional expressions.

TABLE 1

|   | exemplary embodiment |
|---|---|
| f | 1.528 |
| f1 | 1.891 |
| f2 | 1.617 |
| tanΘ | 0.82 |
| OAL | 2.2 |
| FLD | 1.25 |
| Nd | 1.533 |
| Nd3 | 1.642 |
| vd | 56.5 |
| vd3 | 23 |

Referring to Table 1, it can be noted that f1/f is 1.237 that matches the conditional expression 1, f2/f is 1.058 that matches the conditional expression 2, and f2/f1 is 0.85 that matches the conditional expression 3.

The following Table 2 shows an exemplary embodiment which is a more detailed exemplary embodiment over that of Table 1.

TABLE 2

| Surface number | Curvature radius (R) | Thickness or distance (d) | Refractive index (N) |
|---|---|---|---|
| 1* | 1.0275 | 0.300 | 1.53 |
| 2* | −50.000 | 0.070 |  |
| (stop) | Infinity | 0.287 |  |
| 4* | −0.5222 | 0.353 | 1.53 |
| 5* | −0.4018 | 0.030 |  |
| 6* | 1.1442 | 0.260 | 1.64 |
| 7* | 0.6152 | 0.183 |  |
| 8 | Infinity | 0.210 | 1.52 |
| 9 | Infinity | 0.501 |  |
| image | Infinity | 0.005 |  |

The notation * in the above Table 2 and following Table 3, which is further written near the surface number indicates aspheric. The following Tables 3 and 4 respectively show a value of aspheric coefficient of each lens in the exemplary embodiment of Table 2.

TABLE 3

| Surface number | k | A | B | C | D | E | F |
|---|---|---|---|---|---|---|---|
| 1* | 0.074207 | −.226361E+00 | −.965333E+00 | 0.398589E+01 | −.450770E+02 | 0.770700E+02 |  |
| 2* | 0.000000 | −.467000E+00 | −.467000E+00 | −.123419E+02 | 0.579599E+02 |  |  |
| 4* | −2.234518 | −.117742E+02 | −.117742E+02 | −.883901E+02 | 0.157995E+04 | −.329496E+04 |  |
| 5* | −0.465616 | 0.374798E+01 | 0.374798E+01 | −.198913E+02 | −.621791E+01 | 0.513835E+03 |  |
| 7* | −7.234414 | 0.299945E+01 | 0.299945E+01 | −.550763E+01 | 0.585215E+00 | −.301800E+01 | 0.185450E−01 |

TABLE 4

| Surface number | k | AR4 | AR5 | AR6 | AR7 | AR8 |
|---|---|---|---|---|---|---|
| 6* | 1.4501E+00 | −4.1929E+00 | 8.0575E+00 | −8.9548E+00 | 3.6703E−01 | 1.4924E+01 |

| Surface number | AR9 | AR10 | AR11 | AR12 | AR13 | AR14 |
|---|---|---|---|---|---|---|
| 6* | 3.1319E+00 | −3.8456E+01 | −1.0397E+01 | 3.0618E+01 | 8.4482E+01 | −9.7917E+01 |

MODE FOR THE INVENTION

FIGS. 2a and 2b, as graphs measuring coma aberration, are graphs illustrating coma aberration according to an exemplary embodiment of the present invention, where tangential aberration and sagittal aberration of each wavelength based on a field height are measured. In FIGS. 2a and 2b, it is interpreted that a coma aberration correcting function is good as curves approach the X axis from a positive axis and a negative axis. In the measurement examples of FIGS. 2a and 2b of shown aberration diagrams, because values of images in nearly all fields proximate to the X axis, coma aberration correction function demonstrates a superior figure.

FIG. 3 is a graph illustrating spherical aberration according to an exemplary embodiment of the present invention. That is, FIG. 3 is a graph measuring longitudinal spherical aberration, astigmatic field curves and distortion in order from left side. In FIG. 3, a Y axis means size of an image, and an X axis means focal distance (unit: mm) and distortion degree (unit: %). In FIG. 3, it is interpreted that an aberration correcting function is good as curves approach the Y axis. In the shown aberration diagram, because values of images in nearly all fields appear proximate to the Y axis, spherical aberration, astigmatic field curves and distortion all demonstrate a superior figure.

That is, a range of the longitudinal spherical aberration is −0.021 mm~+0.0125 mm, a range of astigmatic field curves is −0.013 mm~+0.014 mm, and a range of distortion is −1.89 mm~+0.53 mm, such that the imaging lens according to the present invention can correct the characteristics of spherical aberration, astigmatic field curves and distortion, whereby the imaging lens according to the present invention has an excellent lens characteristics.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

As apparent from the foregoing, the imaging lens according to the exemplary embodiments of the present invention has an industrial applicability in that a first lens is made to take a convex form at both sides, and a third lens is made of plastic material with a high refractive index, enabling to realize a wide-angled, compact and high resolution imaging lens having a new power structure.

The invention claimed is:

1. An imaging lens comprising, in an ordered way from an object side:
   a first lens having positive (+) refractive power;
   a second lens having positive (+) refractive power;
   a third lens having negative (−) refractive power;
   a photo-detector; and
   a filter placed between the photo-detector and the third lens, wherein the filter is closer to the third lens than it is to the photo-detector;
   wherein an object side surface of the first lens is convexly formed at an optical axis of the imaging lens, an image side surface of the first lens is convexly formed at the optical axis of the imaging lens, an object side surface of the second lens is concavely formed at the optical axis of the imaging lens, an image side surface of the second lens is convexly formed at the optical axis of the imaging lens, an object side surface of the third lens is convexly formed at the optical axis of the imaging lens, and an image side surface of the third lens is concavely formed at the optical axis of the imaging lens, an object side surface of the third lens is convexly formed at an optical axis of the imaging lens,
   wherein the imaging lens meets a conditional expression of $1.5<ND<1.53$, where ND is a refractive index of the first and second lenses,
   wherein the refractive index of the first lens is the same as that of the second lens,
   wherein the imaging lens meets a conditional expression of $1.6<ND3<1.7$, where ND3 is a refractive index of the third lens;
   wherein the imaging lens meets a conditional expression of $20<Vd3<30$, where Vd3 is an Abbe's number of the third lens;
   wherein the imaging lens meets a conditional expression of $50<Vd<60$, where Vd is an Abbe's number of the first and second lenses;
   wherein a power of the second lens is greater than that of the first and third lenses, and
   wherein a first distance between the image side surface of the first lens and the object side surface of the second lens is larger than a second distance between an image side surface of the second lens and the object side surface of the third lens at the optical axis.

2. The imaging lens of claim 1, wherein the third lens takes a meniscus form convexly formed at the object side surface.

3. The imaging lens of claim 1, wherein the imaging lens meets a conditional expression of $0.8<f1/f<1.5$, where f is an entire focus distance (focal length) of the imaging lens, and f1 is a focus distance of the first lens.

4. The imaging lens of claim 1, wherein the imaging lens meets a conditional expression of $0.8<f2/f<1.5$, where f is an entire focus distance (focal length) of the imaging lens, and f2 is a focus distance of the first lens.

5. The imaging lens of claim 1, wherein the imaging lens meets a conditional expression of f2/f1<1.0, where f1 is a focus distance (focal length) of the first lens, and f2 is a focus distance of the second lens.

6. The imaging lens of claim 1, wherein the imaging lens meets a conditional expression of 0.7<tan Θ<0.85, where half field angle of maximum image height is Θ.

7. The imaging lens of claim 1, wherein the imaging lens meets a conditional expression of 0.8<OAL/((FLD)×2)<1.2, where OAL is a total length of an imaging system, and FLD is a maximum image height of the imaging system.

8. The imaging lens of claim 1, wherein an aperture (diaphragm) is positioned between the first and second lenses.

9. The imaging lens of claim 1, wherein the third lens is made of plastic material.

10. The imaging lens of claim 1, wherein at least one surface of the first, second and third lenses is aspheric.

11. The imaging lens of claim 1, wherein the imaging lens meets a conditional expression of R6=0.6152, where R6 is a curvature radius of an image side surface of the third lens.

12. The imaging lens of claim 1, wherein the imaging lens meets a conditional expression of R3=−0.5222, where R3 is a curvature radius of the object side surface of the second lens.

* * * * *